(12) United States Patent
Chan et al.

(10) Patent No.: US 8,305,733 B2
(45) Date of Patent: Nov. 6, 2012

(54) SUPER-CAPACITOR ELECTRODE

(75) Inventors: Lok Yan Lorraine Chan, Dongguan (CN); Rui Li, Dongguan (CN); Fanghui Zhao, Dongguan (CN)

(73) Assignee: Starzeon Electronics (Dongguan) Co., Limited, Dongguan, Guangdong Province (CN)

( * ) Notice: Subject to any disclaimer, the term of this patent is extended or adjusted under 35 U.S.C. 154(b) by 184 days.

(21) Appl. No.: 12/939,469

(22) Filed: Nov. 4, 2010

(65) Prior Publication Data
US 2011/0317332 A1    Dec. 29, 2011

(30) Foreign Application Priority Data
Jun. 23, 2010    (CN) .......................... 2010 1 0207528

(51) Int. Cl.
*H01G 9/00*    (2006.01)
(52) U.S. Cl. ........ 361/502; 361/503; 361/504; 361/509; 361/512; 361/519
(58) Field of Classification Search .................. 361/502, 361/503, 504, 509, 512, 523–525, 528–529, 361/516–519
See application file for complete search history.

(56) References Cited

U.S. PATENT DOCUMENTS

| | | | | | |
|---|---|---|---|---|---|
| 5,304,330 | A | * | 4/1994 | Tatarchuk et al. | 419/2 |
| 6,031,712 | A | * | 2/2000 | Kurihara et al. | 361/502 |
| 6,205,016 | B1 | * | 3/2001 | Niu | 361/503 |
| 6,414,837 | B1 | * | 7/2002 | Sato et al. | 361/504 |
| 6,469,888 | B1 | * | 10/2002 | Otsuki et al. | 361/502 |
| 6,704,192 | B2 | * | 3/2004 | Pekala | 361/502 |
| 7,548,409 | B2 | * | 6/2009 | Kojima et al. | 361/503 |

FOREIGN PATENT DOCUMENTS
CN    101562078 A    10/2009
* cited by examiner

*Primary Examiner* — Nguyen T Ha
(74) *Attorney, Agent, or Firm* — Morgan, Lewis & Bockius LLP

(57) ABSTRACT

A super-capacitor electrode is provided, which comprises a metal foil as a current collector, an active material, a conductive agent, and an organic adhesive agent. The metal foil is an uncorroded smooth metal foil. The super-capacitor electrode further comprises a silane coupling agent for binding the organic adhesive agent and the uncorroded smooth metal foil, so that the active material is adhered to the uncorroded smooth metal foil. In comparison with a case that only organic adhesive agent is used in a super-capacitor electrode, since the silane coupling agent is used in the super-capacitor electrode of the present invention to bind the organic adhesive agent and the uncorroded smooth metal foil, the binding strength of the active material on the uncorroded smooth metal foil is improved without increasing the amount of the agent used for adhering, so that the super-capacitor electrode of the present invention attains perfect overall performance.

18 Claims, No Drawings

SUPER-CAPACITOR ELECTRODE

This application is based upon and claims priority to Chinese Patent Application No. 201010207528.8 filed on Jun. 23, 2010, which application is expressly incorporated herein by reference.

BACKGROUND OF THE INVENTION

1. Field of the Invention

The present invention relates to a super-capacitor, and more particularly, to a super-capacitor electrode.

2. Description of Related Art

Super-capacitor is a special type of energy storage unit being developed in recent years, which is based on the electrochemical reaction at the electrode/solution interface, with characteristic between traditional electrostatic capacitor and chemical power supply.

In the manufacture of a super-capacitor, an electrode is generally prepared by applying a prepared slurry containing an active material onto a current collector. After cutting the electrode and riveting leads, electrodes are stacked with separator papers in the order of separator paper, electrode, separator paper, and electrode, and then wound to form a capacitor core; and then the capacitor core is placed into a shell, and the shell is assembled with an end-cover. Sequentially, after the above assembled capacitor core is filled and impregnated with an electrolyte through a filling hole, the filling hole is sealed. Thus, a super-capacitor is made-up.

In the manufacture of a super-capacitor, a key technique is the electrode material and the manufacturing process for the electrode. Generally, a mono-layer coating method is employed in the manufacturing process of the super-capacitor electrode, i.e., directly applying an active material slurry onto a current collector. Since the internal resistance of the capacitor is affected by the bonding tightness between the active material layer and the current collector, it is required for the monolayer coating method to add more adhesive agent into the active material layer. Thus, for the super-capacitor whose size specification is fixed, since more adhesive agent is required and thereby the amount of the active material is reduced, the energy density of the super-capacitor would be decreased.

In order to enhance the conductivity and the adhesive strength between the active material layer and the current collector, and at the same time to reduce the amount of the adhesive agent used in the active material layer, a method for manufacturing a super-capacitor electrode is disclosed in the Chinese Patent CN101562078A. In this method, an adhesively conductive layer is applied between an active material layer and a current collector. Thus, the conductivity and the adhesive strength between the active material layer and the current collector are enhanced; meanwhile the amount of the adhesive agent used in the active material layer is reduced.

In the patent mentioned above, it is disclosed that the current collector is made from an aluminum foil, a corroded aluminum foil, a copper foil, or a nickel foil. And in this patent, by comparison of the aluminum foil (also referred to as the uncorroded smooth aluminum foil) with the corroded aluminum foil as a current collector, it is found that the super-capacitor using the uncorroded smooth aluminum foil as a current collector has a higher internal resistance than the super-capacitor using the corroded aluminum foil. The reason is that the surface of the uncorroded smooth aluminum foil results in a weak adhesive strength for the active material applied on it. Thus, it is difficult to apply the active material on the surface of the uncorroded smooth metal foil, or, even if the active material layer is applied on the surface of the uncorroded smooth metal foil, the active material layer would peel off rapidly at the course of charge-discharge cycle of the super capacitor product, and thereby the life time of the product is shorten.

In consideration of enhancing the bonding tightness between the active material layer and the current collector, if the uncorroded smooth metal foil is kept unchanged, the amount of an adhesive agent or an adhesively conductive agent must be consequentially increased. So, the demerit still emerges as in the aforementioned monolayer coating method. That is, the increasing of the amount of the adhesive agent or the adhesively conductive agent will affect the amount of the active material used under the fixed size specification of the super-capacitor, and accordingly, it is required to perform a compromise between the amount of the conductive agent and that of the active material. Accordingly, the electrode prepared in this way will not attain perfect overall performance.

In consideration of enhancing the bonding tightness between the active material layer and the current collector, if the adhesive agent is kept unchanged, the uncorroded smooth metal foil should be changed. In the developing history of capacitor, from the initial aluminum electrolytic capacitor to the present super-capacitor, it is a traditional way to use a corroded metal foil as a current collector. One of the important reasons for the use of the corroded metal foil in the aluminum electrolytic capacitor is to increase the electrode area and the capacitance. The main purpose of using the corroded metal foil in the super-capacitor is to enhance the adhesive strength of the active material layer via porous surface of the corroded metal foil, but the increasing of the electrode area is realized by high specific surface area of the active material. However, the capacitor using the corroded metal foil has the disadvantages as follows: (1) due to low mechanical strength and poor processability, the corroded metal foil is apt to wrinkle and break-off; (2) due to a corrosion process of the corroded metal foil, the corroded metal foil is far expensive than the uncorroded metal foil; (3) for ensuring enough mechanical strength, the corroded metal foil is required to be thicker than the uncorroded metal foil, which results in the decrease of the energy density of the product.

Thus, it can be seen that, due to the difficulty caused by the above compromise between the current collector itself and the active material layer, the electrode manufactured by the conventional technique would not attain perfect overall performances.

SUMMARY OF THE INVENTION

In order to overcome the difficulty caused by the compromise between the current collector itself and the active material layer in the prior art, an object of the present invention is to provide a super-capacitor electrode which will attain perfect overall performances without increasing the whole amount of the agent used for adhering.

To the object of the present invention, a super-capacitor electrode is provided, which comprises a metal foil as a current collector, an active material, a conductive agent, and an organic adhesive agent. The metal foil is an uncorroded smooth metal foil. The super-capacitor electrode further comprises a silane coupling agent for binding the organic adhesive agent and the uncorroded smooth metal foil, so that the active material is adhered to the uncorroded smooth metal foil.

In the super-capacitor electrode according to the present invention, alternatively, the adhesion of the active material to the uncorroded smooth metal foil is achieved by applying a slurry containing the silane coupling agent, the active material, the conductive agent, and the organic adhesive agent onto the uncorroded smooth metal foil.

In the super-capacitor electrode according to the present invention, alternatively, the adhesion of the active material to the uncorroded smooth metal foil is achieved by the steps of:
- a first step of applying a silane coupling agent layer onto the uncorroded smooth metal foil; and
- a second step of applying an active material layer containing the active material, the conductive agent, and the organic adhesive agent onto the silane coupling agent layer.

In the super-capacitor electrode according to the present invention, alternatively, the adhesion of the active material to the uncorroded smooth metal foil is achieved by the steps of:
- a first step of applying an adhesively conductive layer containing the silane coupling agent, the conductive agent and the organic adhesive agent onto the uncorroded smooth metal foil; and
- a second step of applying an active material layer containing the organic adhesive agent, the active material and the conductive agent onto the adhesively conductive layer.

In the super-capacitor electrode according to the present invention, alternatively, the adhesion of the active material to the uncorroded smooth metal foil is achieved by the steps of:
- a first step of applying a silane coupling agent layer containing only the silane coupling agent onto the uncorroded smooth metal foil;
- a second step of applying an adhesively conductive layer containing the conductive agent and the organic adhesive agent onto the silane coupling agent layer; and
- a third step of applying an active material layer containing the organic adhesive agent, the active material and the conductive agent onto the adhesively conductive layer.

In the super-capacitor electrode according to the present invention, alternatively, said first step of applying an adhesively conductive layer onto the uncorroded smooth metal foil as a current collector comprises:
- a first sub-step of dissolving the organic adhesive agent and dispersing the conductive agent and the silane coupling agent in a solvent to prepare a slurry containing 5~25 wt % solid constituents in which the organic adhesive agent is 3~15 wt %, the conductive agent is 80~95 wt %, and the silane coupling agent is 0.3~5 wt %;
- a second sub-step of applying the prepared slurry onto a surface of the current collector and making the applied slurry having a thickness of 5~30 μm; and
- a third sub-step of performing air-drying at a temperature of 80~14° C. to form the adhesively conductive layer on the surface of the current collector.

In the super-capacitor electrode according to the present invention, alternatively, said second step of applying an active material layer to the adhesively conductive layer comprises:
- a first sub-step of dissolving the organic adhesive agent and dispersing the active material and the conductive agent in a solvent to prepare slurry containing 10~35 wt % solid constituents in which the organic adhesive agent is 3~15 wt %, the active material is 70~85 wt %, and the conductive agent is 5~20 wt %;
- a second sub-step of applying the prepared slurry to a surface of the adhesively conductive layer; and
- a third sub-step of performing air-drying at temperature of 80~140° C. to form the active material layer on the surface of the adhesively conductive layer.

In the super-capacitor electrode according to the present invention, preferably, wherein the adhesion of the active material to the uncorroded smooth metal foil is achieved by a further step of performing drying and rolling to form a finished product of the electrode having a thickness as prescribed after applying the active material.

In the super-capacitor electrode according to the present invention, preferably, the thickness is 60~200 μm.

In the super-capacitor electrode according to the present invention, preferably, the uncorroded smooth metal foil is an aluminum foil, a copper foil or a nickel foil.

In the super-capacitor electrode according to the present invention, preferably, a general formula for the silane coupling agent is $Y(CH_2)_n SiX_3$, where X is hydrolysable group selected from chloro group, methoxy group, ethyoxyl group, methoxyethoxy group, or acetoxy group, Y is organic group selected from ethylene group, amino group, epoxy group, methacryloxy group, sulfydryl group, or carbamido group, and n=0~3.

In the super-capacitor electrode according to the present invention, preferably, the conductive agent is selected from one of acetylene black, carbon black, synthetic graphite and natural graphite or the combination thereof.

In the super-capacitor electrode according to the present invention, preferably, the organic adhesive agent is at least one of polytetrafluoroethene, polyvinylidene fluoride, carboxymethyl cellulose, polyvinyl alcohol, and crylic acid resin.

In the super-capacitor electrode according to the present invention, preferably, the active material is at least one of activated carbon powder, activated carbon fiber, carbon aerogel, carbon nanotube, and metallic oxide.

In comparison with the prior art, a silane coupling agent is used in the super-capacitor electrode of the present invention to bind the organic adhesive agent and the uncorroded smooth metal foil without increasing the amount of the agent used for adhering. Thereby, in comparison with the prior art that only organic adhesive agent is used in a super-capacitor electrode, the binding strength of the active material on the uncorroded smooth metal foil is improved by using the silane coupling agent in the super-capacitor electrode of the present invention, so that the super-capacitor electrode of the present invention can attain perfect overall performances.

DETAILED DESCRIPTION OF THE PREFERRED EMBODIMENTS

In order to overcome the difficulty caused by the compromise between the metal foil as the current collector and the active material layer in the prior art, a silane coupling agent is used in the present invention to bind the organic adhesive agent and the uncorroded smooth metal foil on the basis of the uncorroded smooth metal foil, without increasing the whole amount of the agent used for adhering. Thereby, in comparison with the prior art that only organic adhesive agent is used in a super-capacitor electrode, the binding strength of the active material on the uncorroded smooth metal foil is improved by using the silane coupling agent in the super-capacitor electrode of the present invention, so that the super-capacitor electrode of the present invention can attain perfect overall performances.

Hereinafter, the super-capacitor electrode according to the invention will be described.

The super-capacitor electrode according to the present invention comprises a metal foil as a current collector, an active material, a conductive agent, and an organic adhesive agent. Herein, the metal foil is an uncorroded smooth metal foil, which may be an aluminum foil, a copper foil, or a nickel foil.

In addition, the super-capacitor electrode further comprises a silane coupling agent, and the active material is bonded to the uncorroded smooth metal foil by the silane coupling agent and the organic adhesive agent.

In the present invention, a general formula for the silane coupling agent is $Y(CH_2)_nSiX_3$, where n=0~3, X is hydrolysable group selected from chloro group, methoxy group, ethyoxy group, methoxyethoxy group, or acetoxy group and could be hydrolyzed to generate silanol $(Si(OH)_3)$ which could further combine with an inorganic material to form siloxane, Y is organic group selected from ethylene group, amino group, epoxy group, methacryloxy group, sulfydryl group, or carbamido group which could react and combine with an organic material.

In the present invention, the silane coupling agent used herein in a form of product brand may be selected from KH550, KH560, KH570, KH792, DL602 or DL171.

In order to realize the bind between the organic adhesive agent and the uncorroded smooth metal foil by the silane coupling agent and thereby adhere the active material to the uncorrode smooth metal foil more reliably, the silane coupling agent can be introduced in the following ways.

The first is a mono-layer coating method, i.e. directly adding the silane coupling agent to a slurry prepared by the active material, the conductive agent, and the organic adhesive agent, and then applying the slurry to the uncorroded smooth metal foil.

The second is a double-layer coating method, i.e. applying a silane coupling agent layer onto the surface of the uncorroded smooth metal foil, and then applying an active material layer onto the silane coupling agent layer. Herein, the silane coupling agent layer may be a layer containing only the silane coupling agent, or a layer containing the silane coupling agent, the conductive agent, and the organic adhesive agent. Specifically, the adhesion of the active material to the uncorroded smooth metal foil can be achieved through a first step of applying a silane coupling agent layer onto the uncorroded smooth metal foil, and a second step of applying an active material layer containing the active material, the conductive agent, and the organic adhesive agent onto the silane coupling agent layer. Alternatively, the adhesion of the active material to the uncorroded smooth metal foil can be achieved through a first step of applying an adhesively conductive layer containing the silane coupling agent, the conductive agent, and the organic adhesive agent onto the uncorroded smooth metal foil, and a second step of applying an active material layer containing the organic adhesive agent, the active material, and the conductive agent onto the adhesively conductive layer.

The third is a triple-layer coating method, i.e. applying a silane coupling agent layer to the uncorroded smooth metal foil, then applying an adhesively conductive layer, and finally applying an active material layer. Specifically, the adhesion of the active material to the uncorroded smooth metal foil is achieved through a first step of applying a silane coupling agent layer only containing the silane coupling agent onto the uncorroded smooth metal foil, a second step of applying an adhesively conductive layer containing the conductive agent and the organic adhesive agent onto the silane coupling agent layer, and a third step of applying an active material layer containing the organic adhesive agent, the active material, and the conductive agent onto the adhesively conductive layer.

The above-mentioned three methods may further comprise a step of performing drying and rolling to obtain a finished product of electrode having a prescribed thickness, which may be 60~200 μm, after applying the active material.

As an example, the latter alternative one in the second method of the above three methods would be illustrated hereinafter to explain how to achieve the adhesion of the active material to the uncorroded smooth metal foil. The latter alternative one in the second method comprises a first step of applying an adhesively conductive layer containing the silane coupling agent, the conductive agent and the organic adhesive agent onto the uncorroded smooth metal foil, and a second step of applying an active material layer containing the organic adhesive agent, the active material and the conductive agent onto the adhesively conductive layer.

The first step of applying an adhesively conductive layer onto the uncorroded smooth metal foil comprises: a first sub-step of dissolving the organic adhesive agent and dispersing the conductive agent and the silane coupling agent in a solvent to prepare a slurry containing 5~25 wt % solid constituents in which the organic adhesive agent is 3~15 wt %, the conductive agent is 80~95 wt %, and the silane coupling agent is 0.3~5 wt %; a second sub-step of applying the prepared slurry onto a surface of the current collector and making the applied slurry having a thickness of 5~30 μm; and a third sub-step of performing air-drying at a temperature of 80~140° C. to form the adhesively conductive layer on the surface of the current collector.

The second step comprises: a first sub-step of dissolving the organic adhesive agent and dispersing the active material and the conductive agent in a solvent to prepare a slurry containing 10~35 wt % solid constituents in which the organic adhesive agent is 3~15 wt %, the active material is 70~85 wt %, and the conductive agent is 5~20 wt %; a second sub-step of applying the prepared slurry onto a surface of the adhesively conductive layer; and a third sub-step of performing air-drying at a temperature of 80~140° C. to form the active material layer on the surface of the adhesively conductive layer.

In the present invention, the conductive agent may be selected from one of acetylene black, carbon black, synthetic graphite and natural graphite or the combination thereof.

In the present invention, the organic adhesive agent may be selected from at least one of polytetrafluoroethene, polyvinylidene fluoride, carboxymethyl cellulose, polyvinyl alcohol, and crylic acid resin.

In the present invention, the active material may be selected from at least one of activated carbon powder, activated carbon fiber, carbon aerogel, carbon nanotube, and metallic oxide.

Finally, the present invention will be described hereinafter through the following embodiments and the comparison examples, but this invention is not limited to these embodiments.

Embodiment 1

Commercially available graphite powder, crylic acid resin, and aminopropyltriethoxysilane (KH550) were used. Firstly, water and ethanol were mixed by 4:1, then, crylic acid resin emulsion was added and dissolved into the above mixture through agitating, and thus an adhesive agent slurry was obtained. Next, the graphite powder was added slowly into the adhesive agent slurry and the KH550 was finally added therein via continuous agitating to form a finished slurry. The proportion of graphite powder, crylic acid resin, and KH550 were 85:13:2 in weight of solid phase. The total solid content in the finished slurry was 20%. By using a coating machine, the above finished slurry was uniformly applied onto an aluminum uncorroded smooth foil having a thickness of 20 μm and made the applied slurry having a thickness of 10 μm. The thus obtained foil was air-dried at 120° C. to form a semifinished electrode. Then the following steps were to form a second coating layer on the semifinished electrode. The second coating layer used commercial available activated carbon powder, acetylene black, and crylic acid resin with a proportion of 85:8:7 in mass percentage. Specifically, at first, activated carbon powder and acetylene black powder were uniformly mixed in a coulter-agitator or a ball grinder. Meanwhile, the adhesive agent was added into the mixture of water and ethanol and agitated with them to form an adhesive slurry. Then, the prepared powder mixture was slowly added into the adhesive slurry, and continuously agitated to form an active material slurry. Next, by the coating machine, the prepared active material slurry was uniformly applied onto a surface of the semifinished electrode so that the applied slurry had a thickness of 150 μm. Then, air-drying was performed at a temperature of 120° C., and the dried electrode was cut into a strip according to a required specification and was riveted with a lead. After interposing a separator paper between one above prepared electrode as an anode and another above prepared electrode as a cathode, aligning and winding steps were performed by a reeler to form a capacitor core. Then, the capacitor core was dried in vacuum at a temperature of 120° C. for 6~24 hours. Then, the capacitor core was put into a shell under the protection of dry-atmosphere, and filled with an appropriate amount of an electrolyte, which was $Et_4NBF_4$/PC of 1M. Finally, the shell was sealed, and thereby a cell of a wound super-capacitor was obtained.

COMPARISON EXAMPLE A

The example was the same as the embodiment 1 except that no silane coupling agent was added in this example.

COMPARISON EXAMPLE B

This example was the same as the embodiment 1 except that no silane coupling agent was added and the current collector was formed by a corroded aluminum foil having a thickness of 30 μm in this example.

High-temperature loading test which characterizes the lifetime of a super-capacitor is performed. The qualified standard is that at 70° C. and at a constant voltage of a rated voltage, the capacitance decrease is less than 20% and the impedance increase is less than 40% after 1000 hours.

The test results showed that capacitance decrease in the comparison example A was more than 20% after 125 hours, and the deconstruction results showed that the peeling of the coating layer was relatively serious. Both the embodiment 1 and the comparison example B were qualified after the test.

The productivity and finished product rate of the embodiment 1 were higher than those of the comparison example B, and the energy density of the embodiment 1 was higher than that of the comparison example B by 10%. The cost of the uncorroded aluminum foil was one third of that of the corroded aluminum foil (comparison example B).

Embodiment 2

This embodiment was the same as the embodiment 1 except that the silane coupling agent used in this embodiment was N-β-(aminoethyl-γ-aminopropyltrimethoxysilane) (KH792), and the test results showed that it was qualified and no peeling of the coating layer occurred.

Embodiment 3

This embodiment was the same as the embodiment 1 except that a current collector was formed by an uncorroded smooth copper foil having a thickness of 10 μm. Under this condition, the energy density of the super-capacitor obtained was higher than that of the embodiment 1 by about 10%, and the internal resistance was lower than that of the embodiment 1 by about 5%. So, it can be seen that the silane coupling agent is not only suitable for the uncorroded smooth aluminum foil but also for the uncorroded smooth copper foil. But the uncorroded smooth copper foil is far expensive than the uncorroded smooth aluminum foil.

Embodiment 4

Commercially available active carbon powder, acetylene black, graphite powder, crylic acid resin, and aminopropyl-triethoxysilane (KH550) were used. Firstly, water and ethanol were mixed by 4:1 then, crylic acid resin emulsion was added and dissolved into the above mixture through agitating, and thus an adhesive agent slurry was obtained. Next, the active carbon powder, acetylene black, and graphite powder were uniformly mixed in a coulter-agitator or a ball grinder, then the prepared powder mixture was slowly added into the adhesive agent slurry and continuously agitated. Finally, KH550 was also added into the adhesive agent slurry to prepare the finished slurry. The proportion of active carbon powder, acetylene black, graphite powder, crylic acid resin, and KH550 were 82:4:4:8:2 in weight of solid phase. The total solid content in the finished slurry was 25%. Subsequently, by a coating machine, the finished slurry was uniformly applied onto an uncorroded smooth aluminum foil having a thickness of 20 μm and made the applied slurry having a thickness of 150 μm. The subsequent steps were the same as those of the embodiment 1. The energy density of the super-capacitor thus prepared was equivalent to that of the embodiment 1, and the internal resistance and capacitance decreasing under high-temperature loading were somewhat higher than those of the embodiment 1, and the total property was a litter lower than that of the embodiment 1. However, in comparison with the embodiment 1, the processing steps in the embodiment 4 were simpler, and the production cost was somewhat reduced.

From the above embodiments, it can be seen that, in comparison with the prior art using a corroded metal foil as a current collector, the present invention brings the following beneficial effects: (1) since the silane coupling agent is used, the active material can be reliably bonded onto the uncorroded smooth metal foil as a current collector; (2) since the uncorroded smooth metal foil has high strength and good mechanical properties, the thickness of the current collector using the uncorroded smooth metal foil can be made as thin as possible, thereby, the energy density of the super-capacitor can be increased; (3) since the uncorroded smooth metal foil has high strength and good mechanical properties, the failure rates in the subsequent processing steps such as coating and winding can be reduced, for example, the wrinkle and break-off defects are reduced; and (4) since the uncorroded smooth metal foil is not required to be corroded, the cost of the uncorroded smooth metal foil is much less than that of an corresponding corroded metal foil.

Although some details in the above embodiments have been illustrated for clarity and easily understanding, it should be understood that the above description should not be regarded as the scope of the present invention defined by the claims. Moreover, it would be apparent to those skilled in the art that various alternatives, modifications, and equivalents can be made in the super-capacitor electrode of the present invention without departing from the technical concept or the scope of the invention, and the appended claims of the present invention will cover these alternatives, modifications, and equivalents.

What is claimed is:

1. A super-capacitor electrode comprising a metal foil as a current collector, an active material, a conductive agent, and an organic adhesive agent, wherein the metal foil is an uncorroded smooth metal foil, and the super-capacitor electrode further comprises a silane coupling agent for binding the organic adhesive agent and the uncorroded smooth metal foil so that the active material is adhered to the uncorroded smooth metal foil.

2. The super-capacitor electrode according to claim 1, wherein the adhesion of the active material to the uncorroded smooth metal foil is achieved by applying a slurry containing the silane coupling agent, the active material, the conductive agent, and the organic adhesive agent onto the uncorroded smooth metal foil.

3. The super-capacitor electrode according to claim 1, wherein the adhesion of the active material to the uncorroded smooth metal foil is achieved by the steps of:
a first step of applying a silane coupling agent layer onto the uncorroded smooth metal foil; and
a second step of applying an active material layer containing the active material, the conductive agent, and the organic adhesive agent onto the silane coupling agent layer.

4. The super-capacitor electrode according to claim 3, wherein the adhesion of the active material to the uncorroded smooth metal foil is achieved by a further step of performing drying and rolling to form a finished product of the electrode having a thickness as prescribed after applying the active material.

5. The super-capacitor electrode according to claim 4, wherein the thickness is 60~200 μm.

6. The super-capacitor electrode according to claim 1, wherein the adhesion of the active material to the uncorroded smooth metal foil is achieved by the steps of:
a first step of applying an adhesively conductive layer containing the silane coupling agent, the conductive agent and the organic adhesive agent onto the uncorroded smooth metal foil; and
a second step of applying an active material layer containing the organic adhesive agent, the active material and the conductive agent onto the adhesively conductive layer.

7. The super-capacitor electrode according to claim 6, wherein the adhesion of the active material to the uncorroded smooth metal foil is achieved by a further step of performing air-drying and rolling to form a finished product of the electrode having a thickness as prescribed after applying the active material.

8. The super-capacitor electrode according to claim 7, wherein the thickness is 60~200 μm.

9. The super-capacitor electrode according to claim 6, wherein said first step of applying an adhesively conductive layer onto the uncorroded smooth metal foil as a current collector comprises:
a first sub-step of dissolving the organic adhesive agent and dispersing the conductive agent and the silane coupling agent in a solvent to prepare a slurry containing 5~25 wt % solid constituents in which the organic adhesive agent is 3~15 wt %, the conductive agent is 80~95 wt %, and the silane coupling agent is 0.3~5 wt %;
a second sub-step of applying the prepared slurry onto a surface of the current collector and making the applied slurry having a thickness of 5~30 μm; and
a third sub-step of performing air-drying at a temperature of 80~140° C. to form the adhesively conductive layer on the surface of the current collector.

10. The super-capacitor electrode according to claim 6, wherein said second step of applying an active material layer onto the adhesively conductive layer comprises:
a first sub-step of dissolving the organic adhesive agent and dispersing the active material and the conductive agent in a solvent to prepare a slurry containing 10~35 wt % solid constituents in which the organic adhesive agent is 3~15 wt %, the active material is 70~85 wt %, and the conductive agent is 5~20 wt %;
a second sub-step of applying the prepared slurry to a surface of the adhesively conductive layer; and
a third sub-step of performing air-drying at a temperature of 80~140° C. to form the active material layer on the surface of the adhesively conductive layer.

11. The super-capacitor electrode according to claim 1, wherein the adhesion of the active material to the uncorroded smooth metal foil is achieved by the steps of:
a first step of applying a silane coupling agent layer containing only the silane coupling agent onto the uncorroded smooth metal foil;
a second step of applying an adhesively conductive layer containing the conductive agent and the organic adhesive agent onto the silane coupling agent layer; and
a third step of applying an active material layer containing the organic adhesive agent, the active material and the conductive agent onto the adhesively conductive layer.

12. The super-capacitor electrode according to claim 11, wherein the adhesion of the active material to the uncorroded smooth metal foil is achieved by a further step of performing air-drying and rolling to form a finished product of the electrode having a thickness as prescribed after applying the active material.

13. The super-capacitor electrode according to claim 12, wherein the thickness is 60~200 μm.

14. The super-capacitor electrode according to claim 1, wherein the uncorroded smooth metal foil is an aluminum foil, a copper foil or a nickel foil.

15. The super-capacitor electrode according to claim 1, wherein a general formula for the silane coupling agent is $Y(CH_2)_nSiX_3$, where X is hydrolysable group selected from chloro group, methoxy group, ethyoxy group, methoxyethoxy group, or acetoxy group, Y is organic group selected from ethylene group, amino group, epoxy group, methacryloxy group, sulfydryl group, or carbamido group, and n=0~3.

16. The super-capacitor electrode according to claim 1, wherein the conductive agent is selected from one of acetylene black, carbon black, synthetic graphite and natural graphite or the combination thereof.

17. The super-capacitor electrode according to claim 1, wherein the organic adhesive agent is at least one of polytetrafluoroethene, polyvinylidene fluoride, carboxymethyl cellulose, polyvinyl alcohol, and crylic acid resin.

18. The super-capacitor electrode according to claim 1, wherein the active material is at least one of activated carbon powder, activated carbon fiber, carbon aerogel, carbon nanotube, and metallic oxide.

* * * * *